United States Patent
Choi et al.

(10) Patent No.: US 7,362,392 B2
(45) Date of Patent: Apr. 22, 2008

(54) FABRICATING METHOD FOR A FERROELECTRIC LIQUID CRYSTAL PANEL

(75) Inventors: Suk-Won Choi, Anyang-shi (KR); Su-Seok Choi, Hanam-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 137 days.

(21) Appl. No.: 10/848,065

(22) Filed: May 19, 2004

(65) Prior Publication Data

US 2004/0207776 A1    Oct. 21, 2004

Related U.S. Application Data

(62) Division of application No. 09/740,967, filed on Dec. 21, 2000, now Pat. No. 6,757,035.

(30) Foreign Application Priority Data

Dec. 21, 1999    (KR)    ............................... 1999-59598

(51) Int. Cl.
*G02F 1/1333*    (2006.01)
(52) U.S. Cl. ....................................................... 349/88
(58) Field of Classification Search ................... 349/88
See application file for complete search history.

(56) References Cited

U.S. PATENT DOCUMENTS 5,434,685 A * 7/1995 Pirs et al. ..................... 349/88
6,038,009 A    3/2000 Miyazaki et al.

FOREIGN PATENT DOCUMENTS

JP    09-221463    8/1997
KR    1998-023051    7/1998

OTHER PUBLICATIONS

Yasufumi Asao et al., "Novel Ferroelectric Liquid Crystal Mode for Active Matrix Liquid Crystal Display Using Cholesteric-Chiral Smectic C Phase Transition Material", Jan. J. Appl. Phys. vol. 38 (1999) pp. 5977-5982.

* cited by examiner

*Primary Examiner*—James A. Dudek
(74) *Attorney, Agent, or Firm*—McKenna Long & Aldridge LLP (57) ABSTRACT

A liquid crystal display device, and a method of fabricating such a liquid crystal display device, that uses a ferroelectric liquid crystal (FLC). Additives are added to the ferroelectric liquid crystal. The additives are then used to form polymer networks, beneficially by exposure to ultraviolet light. Suitable additives include an acrylate compound.

9 Claims, 11 Drawing Sheets

Ferroelectric liquid cryystal    Acrylic LC monomer

FABRICATING METHOD FOR A FERROELECTRIC LIQUID CRYSTAL PANEL

This application is a divisional of prior application Ser. No. 09/740,967, filed Dec. 21, 2000 now U.S. Pat. No. 6,757,035.

This application claims the benefit of Korean Patent Application No. 1999-59598, filed on Dec. 21, 1999, which is hereby incorporated by reference for all if fully set forth herein.

BACKGROUND OF THE INVENTION

1. Field of the Invention

This invention relates to liquid crystal displays. More particularly, it relates to liquid crystal displays that use ferroelectric and anti-ferroelectric liquid crystals.

2. Discussion of the Related Art

A conventional liquid crystal display (LCD) includes a display panel having upper and lower substrates that are attached to each other, and an interposed liquid crystal, usually a nematic, a smetic, or a cholesteric liquid crystal. A liquid crystal display utilizes the electro-optic effects of the liquid crystal. The display panel is operationally divided into a plurality of liquid crystal cells. On the exterior surfaces of the upper and lower substrates, polarizers or retardation films are selectively attached.

A major design consideration of a liquid crystal cell is the characteristic of the particular liquid crystal that is used. A good liquid crystal should have a fast response time, a good gray scale, and a wide viewing angle, all while operating at a low driving voltage. However, it is very difficult to find a liquid crystal that has all of those characteristics. Thus, various designs have been adopted for liquid crystal display devices.

Among the various types of liquid crystals displays, the 90° twist mode TN liquid crystal display has neither a wide viewing angle nor a fast response time. An in-plane switching (IPS) mode has a wide viewing angle, but a relatively slow response time that results in decreased luminance and poor moving image quality. To overcome the problem of a slow response time, various technologies have been proposed. For a fast response time, LTN (low twisted nematic) and OCB (optically compensated birefringence) modes have been studied. However, those technologies have not yet been able to provide the fast response time of a CRT.

Figure 1:
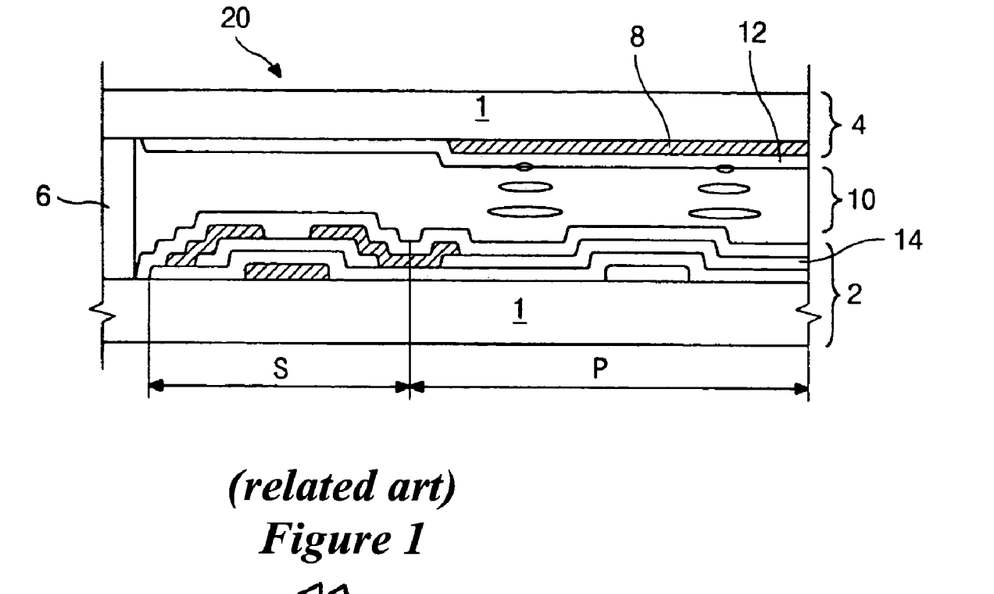
FIG. 1 is a cross-sectional view of a typical TFT liquid crystal display panel.

FIG. 1 is a cross-sectional view illustrating a conventional TN-LCD panel. As shown in FIG. 1, the TN-LCD panel has lower and upper substrates 2 and 4 and an interposed liquid crystal layer 10. The lower substrate 2 includes a substrate 1 having a TFT "S" that is used as a switching element that changes the orientation of the liquid crystal molecules. The TFT "S" includes a pixel electrode 14 that applies a voltage to the liquid crystal layer 10 in accordance with signals that are applied to the TFT "S". The upper substrate 4 has a color filter 13 for implementing color, and a common electrode 12 on the color filter 8. The common electrode 12 serves as an electrode for applying a voltage to the liquid crystal layer 10. The pixel electrode 14 is arranged over a pixel portion "P," i.e., a display area. Further, to prevent leakage of the liquid crystal layer 10 between the two substrates 2 and 4, those substrates are sealed by a sealant 6.

Figure 2A:
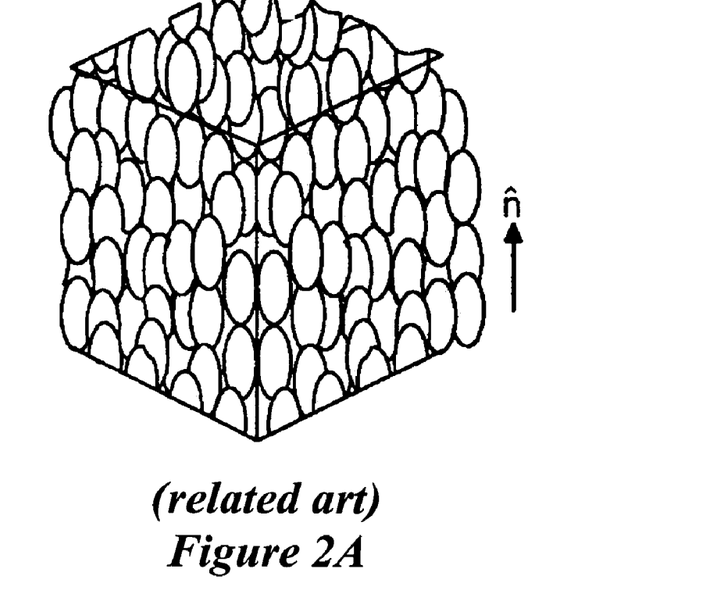
FIGS. 2A, 2B, and 2C illustrate molecular alignments of nematic, smetic, and cholesteric liquid crystals, respectively.
Figure 2B:
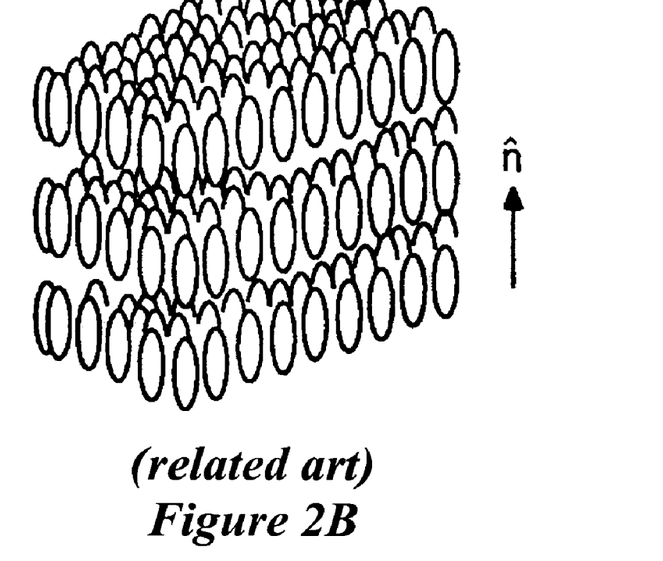
Figure 2C:
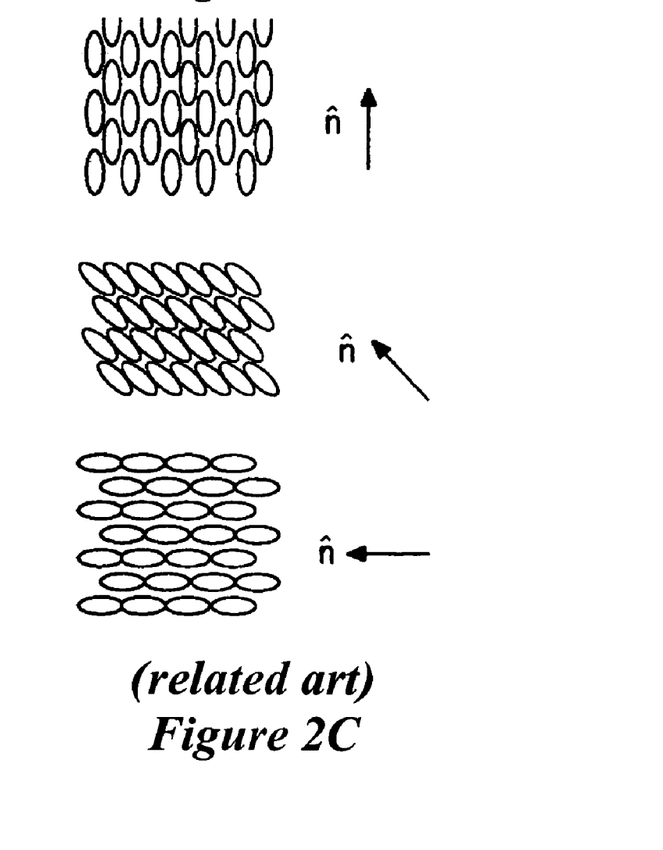

FIGS. 2A to 2C illustrate possible alignments of liquid crystal molecules in a liquid crystal layer. In a nematic liquid crystal, while each rod-like molecule fluctuates quite rapidly, as shown in FIG. 2A the molecules have a definite orientational order expressed by a unit vector "ñ" called a director. As shown in FIG. 2B, in a smetic liquid crystal the molecules positionably have a layered structure in which the molecular orientation is tilted perpendicular to the layers. As shown in FIG. 2C, in a cholesteric liquid crystal, the director ñ changes its orientation gradually along a helical axis. The helical axis coincides with the optical axis of this material. Among the different types of liquid crystals, the nematic liquid crystal is most widely used in liquid crystal display devices.

Liquid crystals for liquid crystal display devices should:

a) have a liquid crystal phase that extends from low to high temperatures, and thus can operate over a range of temperatures;

b) be chemically and optically stable over time;

c) have a low viscosity and a fast response time;

d) have highly ordered molecular alignments, and thus provide good contrast; and e) have a large dielectric anisotropy and a low operating voltage.

The electro-optic effect enables electrical modulation of light by changing the alignment of the liquid crystal molecules using an applied electric field.

Among the various types of nematic liquid crystals, a twisted nematic (TN) liquid crystal and a super twisted nematic (STN) liquid crystal are often used. In a TN liquid crystal panel, a nematic liquid crystal is interposed between transparent lower and upper substrates. Those substrates induce a definite molecular arrangement such that a gradual rotation of the molecules occurs between the lower transparent substrate and the upper transparent substrate until a twist angle of 90 degrees is achieved. In an STN liquid crystal panel the angle of twist rotation is increased to 180 or to 360 degrees.

Figure 3A:
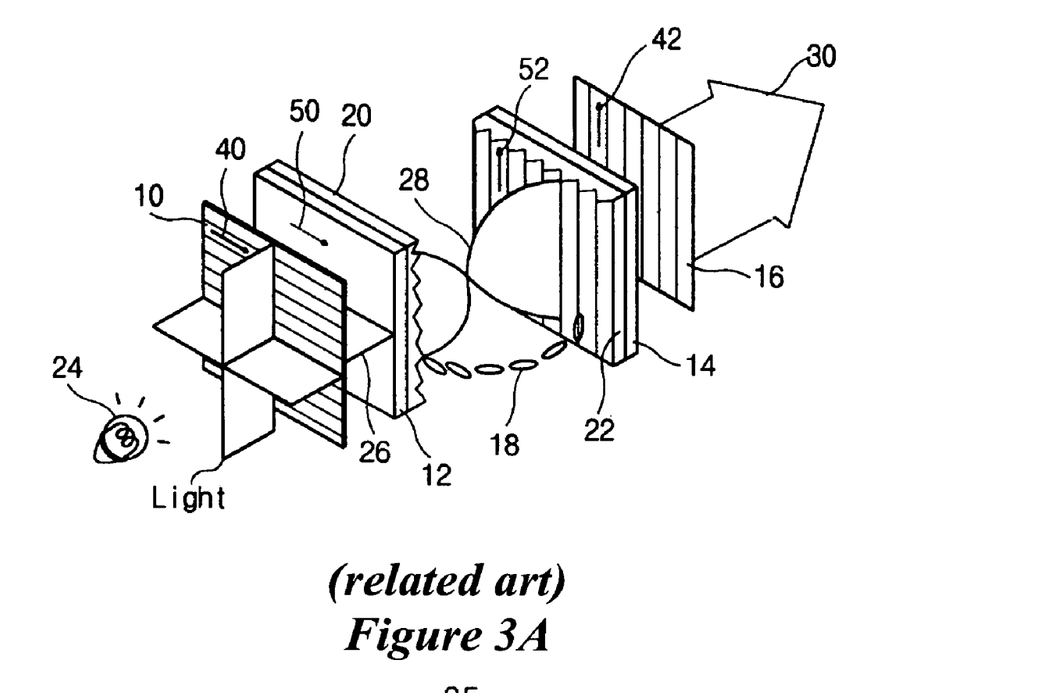
FIGS. 3A and 3B illustrate a configuration and an operation of a liquid crystal panel.

The basic configuration and operation of a twisted nematic liquid crystal display device will now be explained. As shown in FIG. 3A, opposed and spaced apart first and second polarizers 10 and 16, respectively, have perpendicular first and second transmittance axis directions 40 and 42. Between the two polarizers 10 and 16 are first and second transparent substrates 12 and 14, which are also opposed to and spaced apart from each other. Spacers are used to maintain the cell gap between the substrates. For example, plastic balls or silica balls having a diameter of 4 to 5 micrometers can be sprayed on the first substrate.

Still referring to FIG. 3A, the first and the second transparent substrates 12 and 14 include first and second orientation films 20 and 22, respectively, on their opposing surfaces. Between the first and second orientation films 20 and 22 is a positive TN liquid crystal 18.

The positive TN liquid crystal has a characteristic that it arranges according to an applied electric field. The first and second polarizer 10 and 16, respectively, transmit light that is parallel with their transmittance-axis directions 40 and 42, but reflect or absorb light that is perpendicular to their transmittance-axis directions 40 and 42.

The first and second orientation films 20 and 22 were previously rubbed in a proper direction with a fabric. This rubbing causes the positive TN liquid crystal molecules between the first and second transparent substrates 12 and 14 to become tilted several degrees. First and second rubbing directions 50 and 52 of the first and second orientation films 20 and 22 are, respectively, parallel with the transmittance-axis directions of the first and second polarizers 10 and 16. With no electric field applied across the positive TN liquid crystal 18, the orientation of the liquid crystal molecules twists between one substrate and the other at a definite angle, that angle being the twisted angle of the positive TN liquid crystal 18.

During operation, a back light device 24 irradiates white light onto the first polarizer 10. The first polarizer 10 transmits only the portion of the light that is parallel with the first transmittance-axis direction 40. The result is a first linearly polarized light 26 that passes through the polarizer 10. The first linearly polarized light 26 then passes into the positive TN liquid crystal 18 via the first transparent substrate 12.

As the first polarized light 26 passes through the positive TN liquid crystal 18, the first polarized light 26 changes its phase according to the twist alignment of the positive TN liquid crystal molecules. Accordingly, the first linearly polarized light 26 becomes an elliptically (possibly circularly) polarized light 28.

The elliptically polarized light 28 passes through the second transparent substrate 14, and meets the second polarizer 16. When the elliptically polarized light 28 passes through the second polarizer 16, the second polarizer 16 transmits only the portion of the elliptically polarized light 28 that is parallel to the second transmittance-axis direction 42. A polarized light 30 is then emitted. In the above-mentioned operation, a white state is displayed.

Figure 3B:
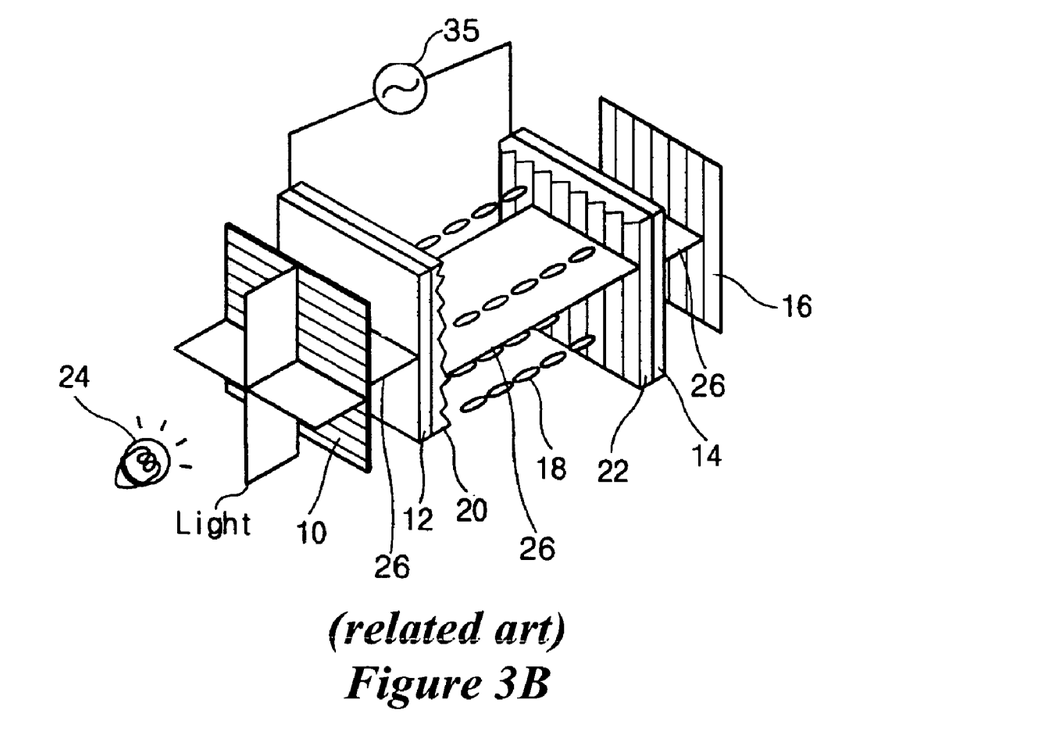

Turning now to FIG. 3B, when a voltage supplier 35 induces an electric field through the positive TN liquid crystal 18, the positive TN liquid crystal molecules rotate and arrang such that the longitudinal axes of the molecules become perpendicular to the surfaces of the first and second substrates 12 and 14. Accordingly, the first linearly polarized light 26 passes through the first transparent substrates 12, the positive TN liquid crystal 18, and the second transparent substrate 14 without phase change. The first linearly polarized light 26 then meets the second polarizer 16. As the second polarizer 16 has the second transmittance-axis direction 52 which is perpendicular to the first linearly polarized light 26, the second polarizer 16 absorbs or shields most of the first linearly polarized light 26. Thus, little or none of the first linearly polarized light 26 passes through the second polarizer 16. Accordingly, a dark state is displayed.

Generally, the response time of a nematic liquid crystal display is greater than 15 ms. This is because of a low elastic constant and the time required to polarize the molecules. This results in decreased luminance when a nematic liquid crystal display produces high speed moving images.

Because of that limitation, a ferroelectric liquid crystal (FLC) in the smetic phase has become of interest. The FLC has a hundred times faster response time than the TN LC or the STN LC. This is because the FLC has a spontaneous polarization that leads to high-speed responses, and thus an improvement in the display of moving images. For example, a deformed helix FLC (DHF), a surface stabilized FLC (SS-FLC), an AFLC, a V-shape FLC, and a half-VFLC (HV-FLC) have been developed for the LCD device.

Except for the DHF FLC, to use a ferroelectric LC in a liquid crystal display application, the cell gap between the two transparent substrates of a liquid crystal display device should be uniformly maintained at less than about 2 micrometers.

Among the various ferroelectric LCs, the V-shape FLC and the HV-FLC have recently become of significant interest due to their advantages in producing gray scale images and to their operational modes. Prototypes implementing these FLCs have been produced.

Figure 4A:
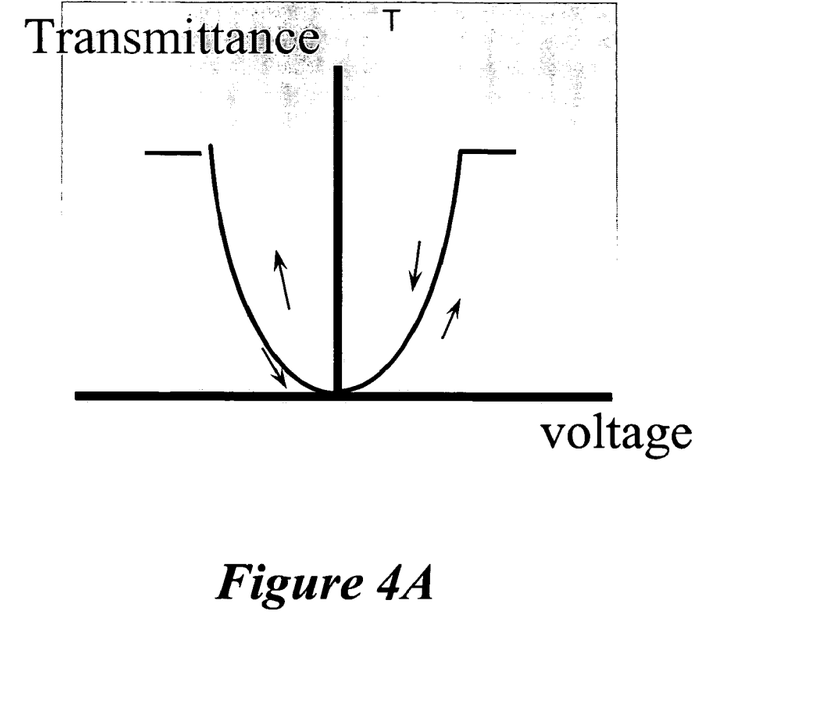
FIGS. 4A and 4B are graphs of electro-optic properties of a V-shaped FLC and an HV-FLC, respectively.
Figure 4B:
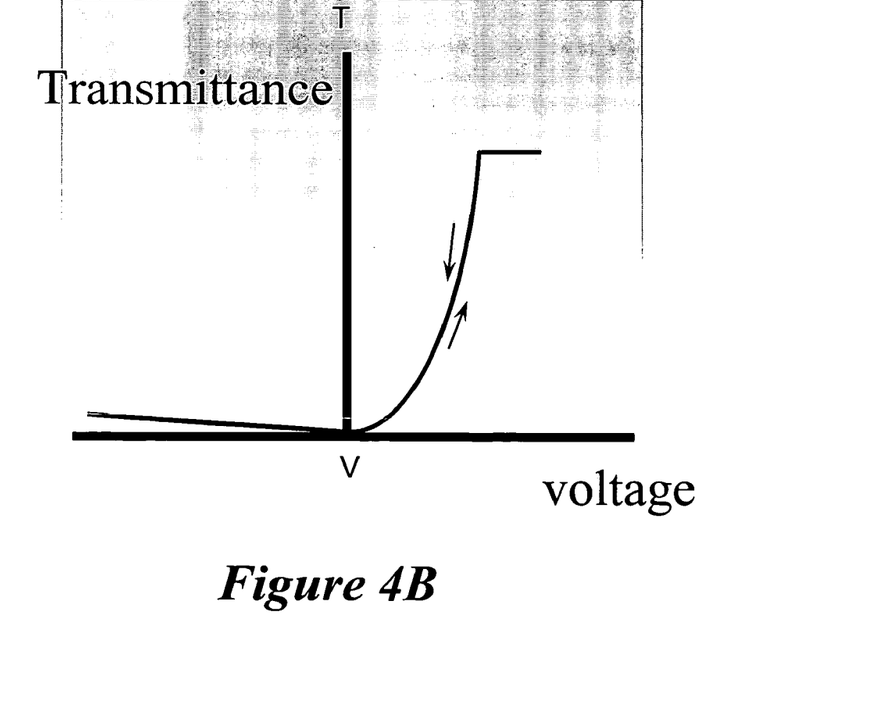

FIGS. 4A and 4B respectively illustrate electro-optic properties of the V-shape FLC and the HV-FLC. As indicated, the transmittance of the V-shape FLC and the HV-FLC are readily controlled by a voltage.

Figure 5:
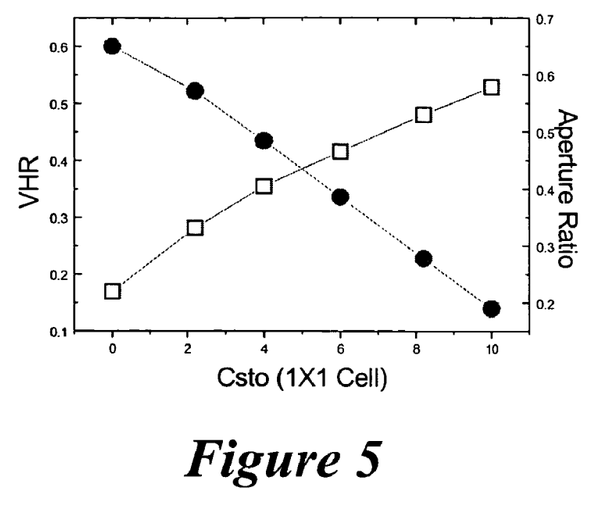
FIG. 5 is a graph illustrating relations between the VHR, an aperture ratio, and a storage capacitor.

When driving a TFT Liquid Crystal Display, the VHR (voltage holding ratio) property is important. As the VHR becomes smaller, each pixel element requires a larger storage capacitance so that more charge becomes available to prevent or to compensate for charge leak. However, as shown in FIG. 5 this decreases the aperture ratio. Additionally, a larger storage capacitor requires a higher voltage driver IC.

Figure 6:
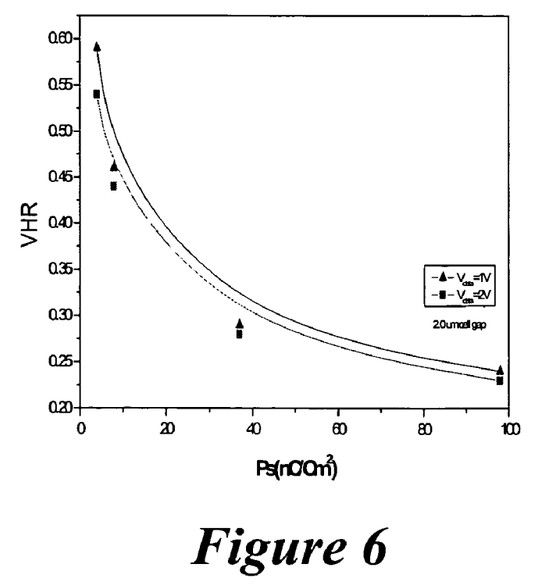
FIG. 6 is a graph illustrating a VHR property of a conventional HV-FLC.

In general, for a nematic liquid crystal TFT-LCD the VHR is above 95%. Thus, the VHR it is not a significant problem for such displays. However, a ferroelectric liquid crystal (FLC) has a VHR that is much smaller, possibly under 50%. This is due to the depolarization effect of the liquid crystal, which is directly related to spontaneous polarization. So, as shown in FIG. 6, the VHR becomes smaller as the spontaneous polarization (Ps) becomes larger.

As result, It is difficult to drive a FLC having a large spontaneous polarization with a TFT The Ps (spontaneous polarization) value of a V-shape FLC ranges into several hundred $nC/Cm^2$, but an HV-shape FLC has a Ps value under 10 $nC/Cm^2$. So, the HV-FLC has a significant advantage in this regard.

Figure 7A:
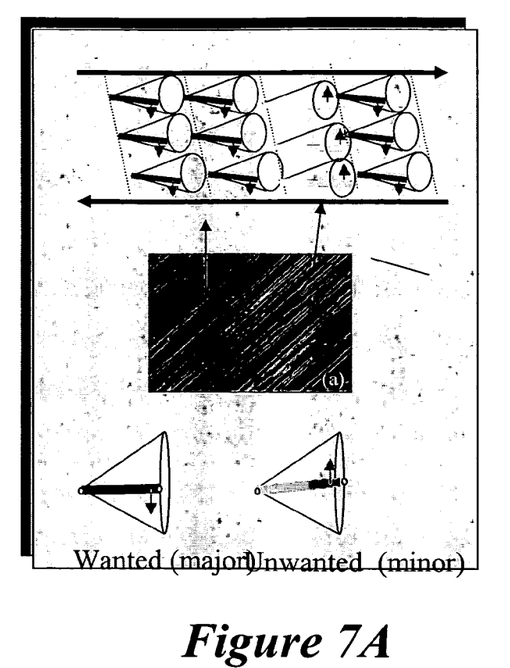
FIG. 7A illustrates two random domains of the conventional HV-FLC.

Additionally, the V-shape FLC undergoes phase transitions of "Isotropic-->N*-->Sc*-->crystal" as the temperature decreases. The HV-FLC has phase transitions of "Isotropic-->N*-->Sc*-->crystal" as the temperature decreases. If only cooling is conducted until the Sc* phase (the phase at room temperature and at the driving temperature), random 2-domain molecular orientations appear due to unwanted molecule configurations as shown FIG. 7A.

Figure 7B:
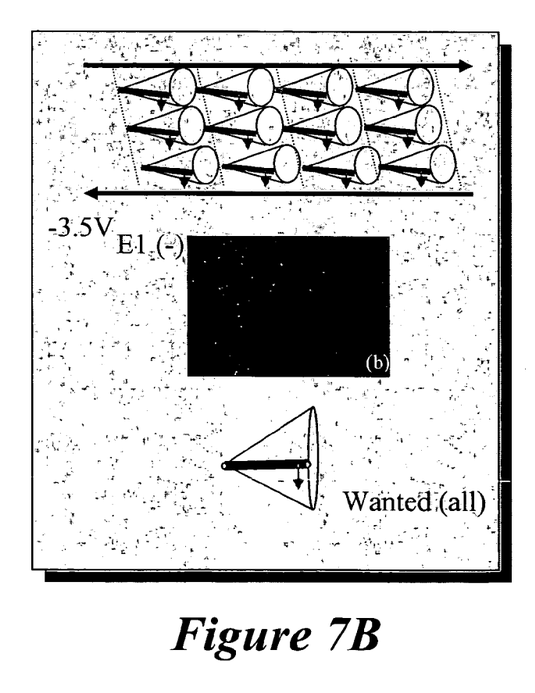
FIG. 7B illustrates a mono-domain of the conventional HV-FLC.
Figure 8A:
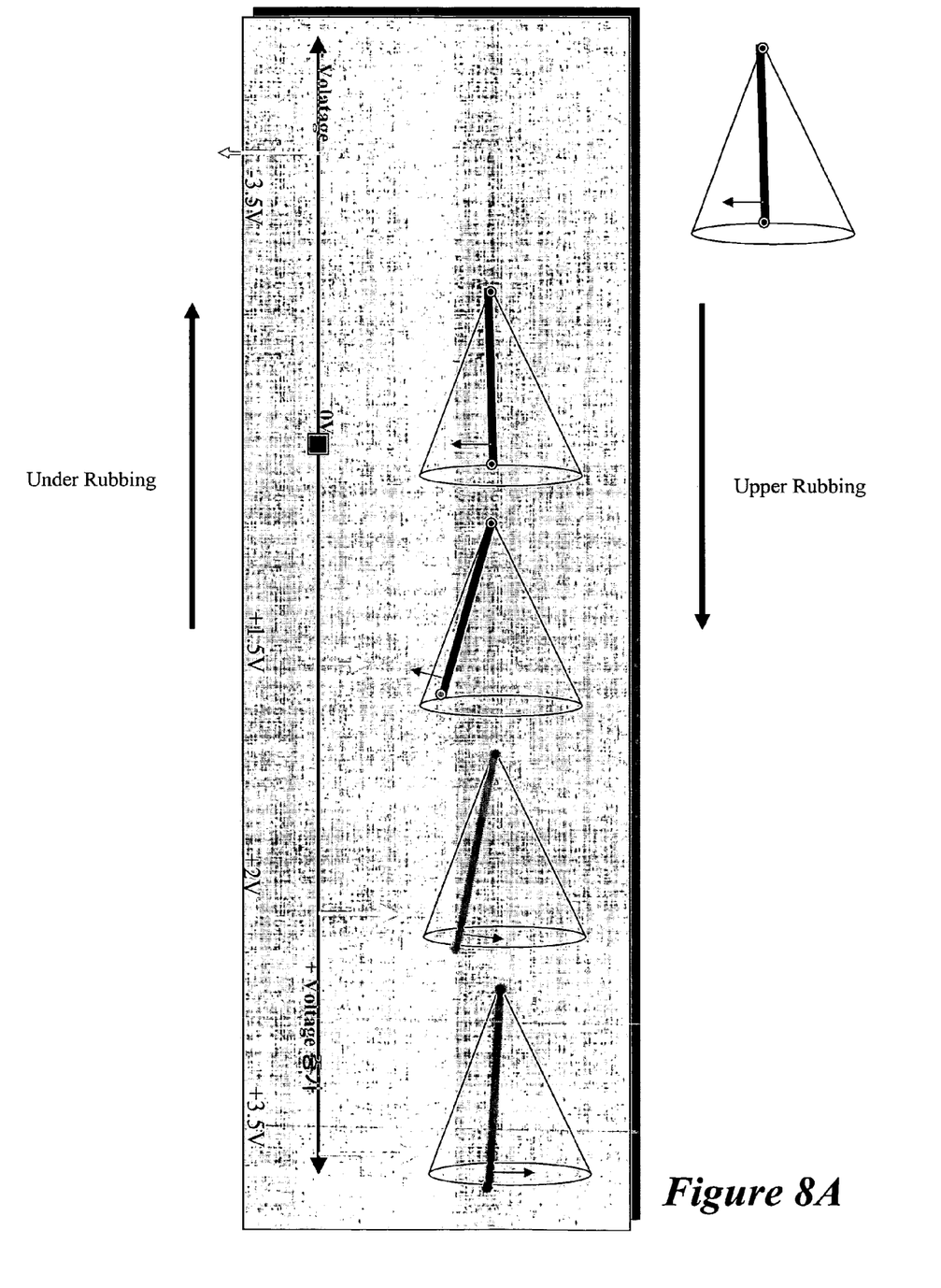
FIG. 8A shows a driving of the conventional HV-FLC.
Figure 8B:
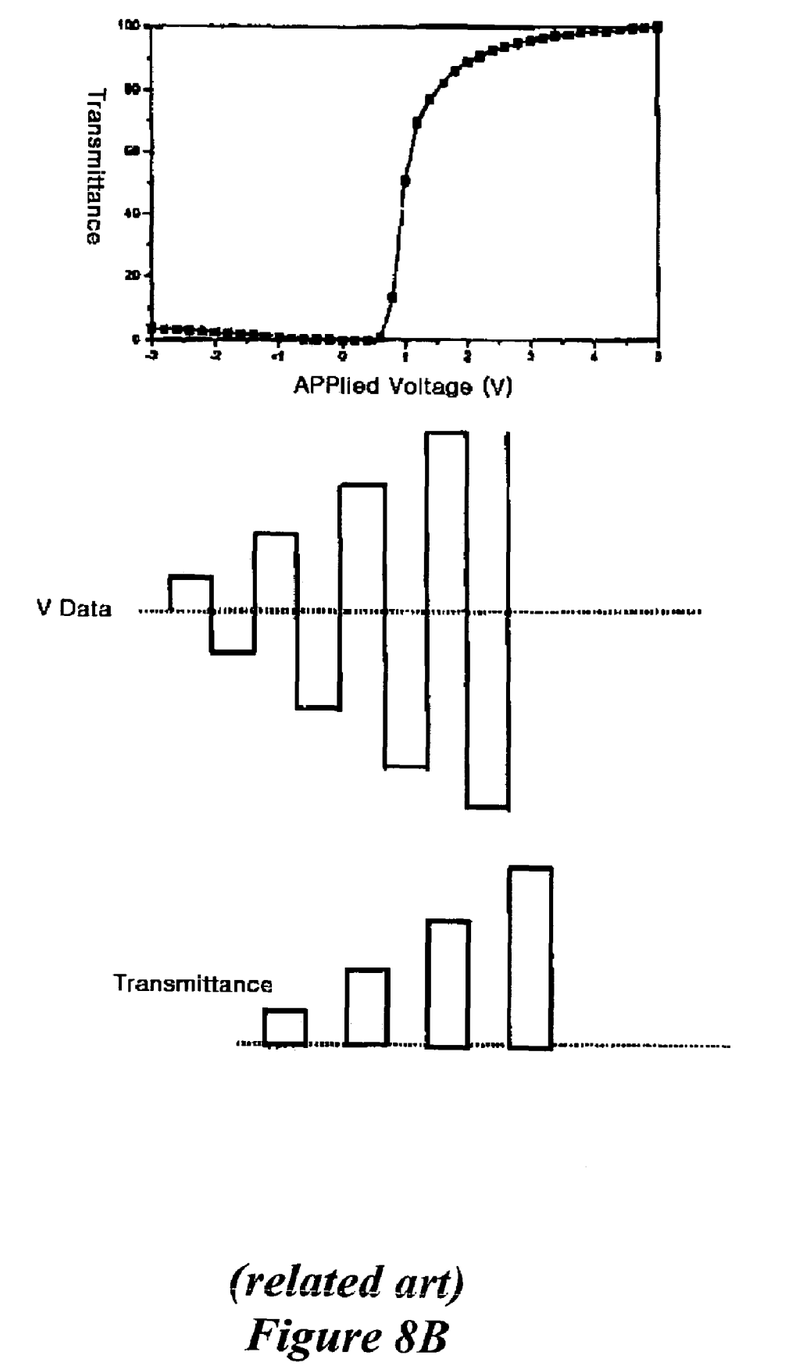
FIG. 8B shows an electro-optic curve of the conventional HV-FLC.

However, if an appropriate DC (direct current) electric field (−polarity) is applied during the N*-->Sc* phase transition (over a small temperature range), the unwanted molecule configuration is suppressed. As a result, as shown in FIG. 7B, all of the molecules properly align. FIG. 7B shows a proper alignment (mono-domain) achieved using an appropriate DC electric field. In this state, the liquid crystals continuously rotate around a cone angle of 50° until they react to an applied electric field. FIG. 8A illustrates the driving of a HV-FLC, while FIG. 8B illustrates electro-optic curves of the driven HV-FLC.

So, a HV-FLC has good alignment, the same transmittance as a nematic due to the 50° cone rotation, and a small Ps, all of which makes them suitable for LCD applications.

While the HV-FLC has many good properties, is has very weak resistance to both thermal stress and mechanical stress. Although all molecules can be aligned by applying an appropriate DC (direct current) electric field (−polarity) during the N*-->Sc* phase transition, thermal stress causes the reverse transition from Sc*-->N* to occur. Then, the mono-domain alignment is broken and the unwanted random domains reappear after cooling back to the Sc* phase. Furthermore, mechanical stress can break the mono-domain alignment. Then, the unwanted random domains reappear.

Figure 9A:
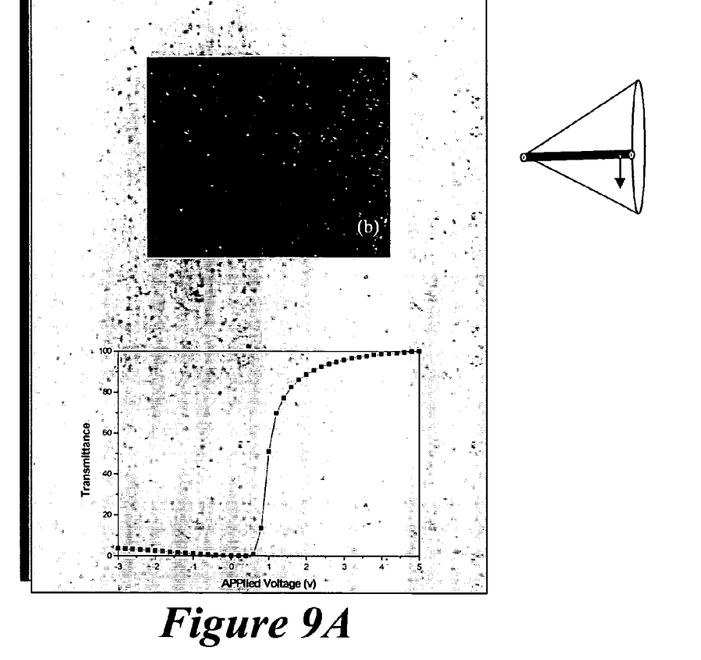
FIG. 9A shows an electro-optic curve (luminance versus voltage) and light leakage from a mono-domain cell.
Figure 9B:
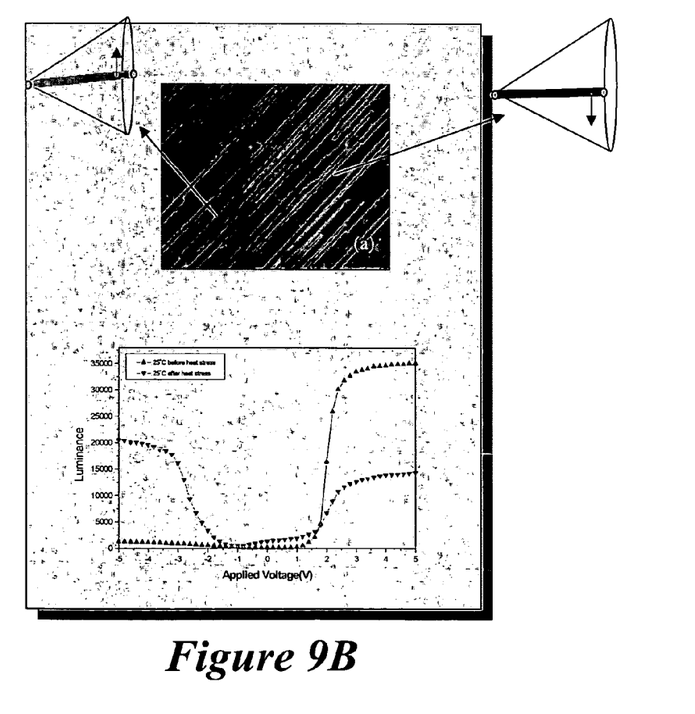
FIG. 9B is a luminance versus voltage graph illustrating changes in an electro-optic property of a conventional SmC* phase before and after thermal stress.

FIG. 9A illustrates an electro-optic curve and the image of a mono-domain aligned cell. FIG. 9B shows electro-optic curves and an image of a cell having a broken alignment and random 2-domains. As shown, light leakage occurs from a cross polarizer.

SUMMARY OF THE INVENTION

Accordingly, the principles of the present invention relate to liquid crystal panels that are designed to substantially obviate one or more of the problems due to the limitations and disadvantages of the related art.

It is an object of the present invention to provide a liquid crystal display panel having a fast response time.

Additional features and advantages of the invention will be set forth in the description that follows, and in part will be apparent from that description, or may be learned by practice of the invention. The objectives and other advantages of the invention will be realized and attained by the structure particularly pointed out in the written description and claims hereof as well as the appended drawings.

The principles of the present invention provide for a method of fabricating a liquid crystal display device. Such a method includes forming a first orientation film on a first substrate, forming a second orientation film on a second substrate, spacing the first and second substrates apart, and then interposing a ferroelectric liquid crystal layer between the first and second substrates. That ferroelectric liquid crystal layer includes a special additive. The method further includes aligning the ferroelectric liquid crystal layer above a phase transition temperature (the SmA phase in some cases, the Sc* phase in others), and then forming polymer networks by exposing the ferroelectric liquid crystal layer to light such that the additive in the ferroelectric liquid crystal layer is polymerized. In such a method, the additive beneficially includes a monoacrylate compound, a diacrylate compound, or a combination of both. Beneficially, polymer networks are formed using ultraviolet light. Additionally, the polymer networks are beneficially formed along molecular layer boundaries of the ferroelectric liquid crystal layer and/or across molecular layer boundaries of the ferroelectric liquid crystal layer.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF AN ILLUSTRATED EMBODIMENT

Reference will now be made in detail to an embodiment of the present invention, the example of which is illustrated in the accompanying drawings.

Figure 10:
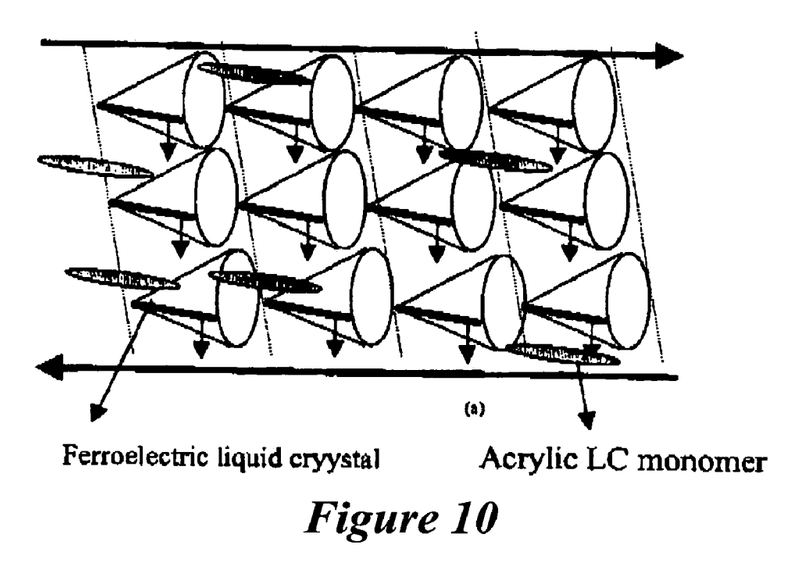
FIG. 10 illustrates an alignment direction of a ferroelectric liquid crystal layer along an acrylate monomer.

According to the principles of the present invention, an additive is mixed into a ferroelectric liquid crystal (FLC). Beneficially, that additive includes an acrylate compound. Before polarization, a (–) direct current electric field is applied during the phase transition. This provides for a good mono-domain alignment of the FLC. After this, the acrylate monomer aligns along the ferroelectric liquid crystal (as shown in FIG. 10). When mixing an additive into the FLC, only a small quantity of additive should be used. This tends to prevent the electro-optic properties of the FLC from varying due to the additive. The additives are 1 to 3% by weight.

Figure 11:
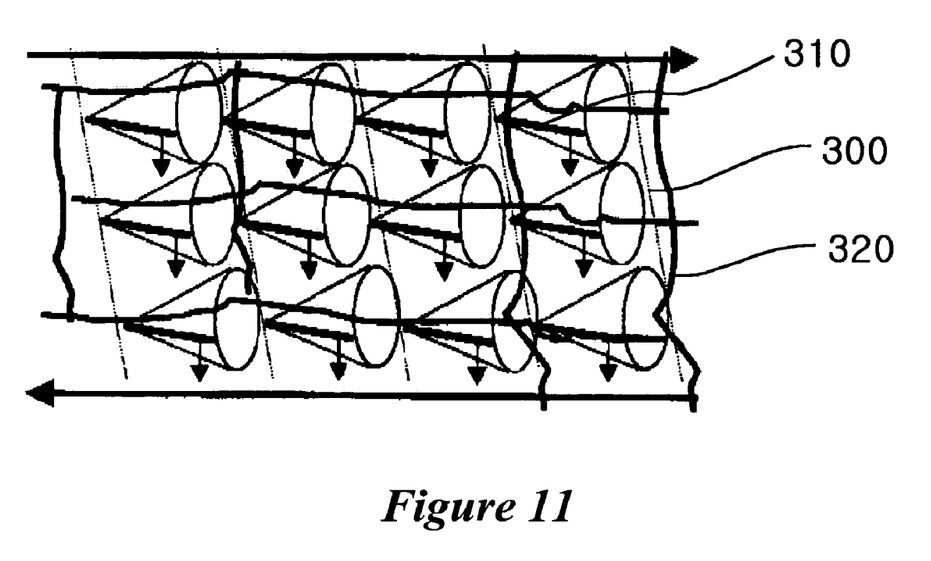
FIG. 11 illustrates a polymerization of an acrylate monomer mixed into a ferroelectric liquid crystal layer.

FIG. 11 illustrates polymerization of an acrylate compound mixed into a FLC 310. As the FLC 310 mixed with the acrylate compound is exposed to light, intra-layer or inter-layer polymer networks 320 are formed along the molecular layer boundaries 300 of the FLC 310. This is due to the polymerization of the acrylate compound caused by the light. That polymerization tends to stabilize the FLC molecules. Beneficially, the light that is used for polymerization is ultraviolet light. The acrylate compounds beneficially includes monoacrylate and diacrylate compounds.

Now, the process of fabricating a liquid crystal panel implementing the FLC layer will be provided.

At first, the FLC is mixed with an additive. The mixed FLC is then interposed between first and second substrates of a liquid crystal panel. The substrates are then sealed using a sealant. The first and second substrates preferably have, respectively, first and second orientation films on their opposing surfaces, and the first and second orientation films are beneficially adapted for homogeneous alignment.

The first substrate includes a transparent substrate. A pixel electrode and a color filter are respectively formed on the first and second substrates. In addition, the present invention includes a backlight.

In the case of a HV-FLC, the HV-FLC is mixed with a small quantity of additives. The HV-FLC is aligned during the transition phase from an N* phase to an Sc* phase by the application of a direct electric field to the HV-FLC. After the HV-FLC in the Sc* phase becomes mono-stable, the direct electric field is removed. Then, light is used to expose the HV-FLC. The resulting polymer networks form across and along the HV-FLC molecular layers. The amount of the additives is beneficially controlled such that the polymer-stabilized HV-FLC has similar optical properties to that of an HV-FLC without additives. The principles of the present invention can be also be applied to a V shaped FLC (during the SmA⇒SmC* phase transition).

Figure 12:
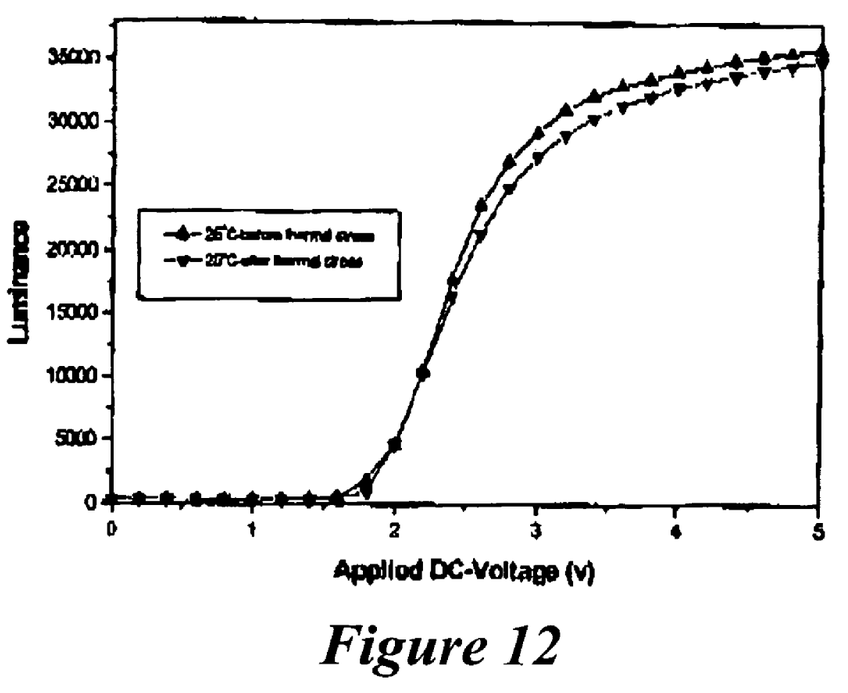
FIG. 12 is a luminance versus voltage graph illustrating changes in an electro-optic property of the SmC* phase before and after applying a thermal stress, when polymer networks are formed in the FLC according to the principles of the present invention.

When a thermal stress is applied to a polymer-stabilized HV-FLC, an Sc* to N* phase transition occurs. Then, when the N* phase transitions back to the Sc* phase (by another temperature change) the liquid crystal molecules return to the mono-stable alignment. Significantly, the electro-optical properties of a polymer-stabilized HV-FLC tend to be stable over temperature changes. This result is similar to what is shown in FIG. 12.

Figure 13:
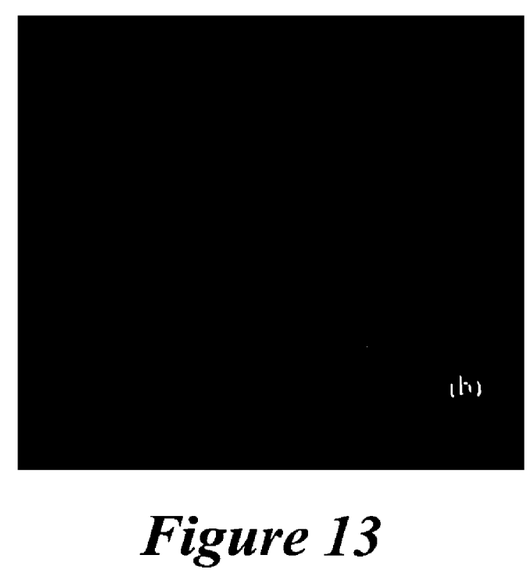
FIG. 13 illustrates a black state of an HV-FLC according to an embodiment of the present invention after a thermal stress is applied.

FIG. 13 is an enlarged view of an HV-FLC according to the principles of the present invention after a thermal stress. Unlike that shown in FIG. 9B, there is no white. Thus, the liquid crystal molecules maintain their alignment in spite of the thermal stress.

In another aspect, to form the polymer networks, ultra-violet (UV) rays of light are beneficially used. The irradiating energy of the UV light is beneficially controlled to be within a range of 40 to 200 $mJ/cm^2$. This prevents cleavage of the FLC as well as providing a sufficient anchoring force between the orientation film and the FLC molecules. Further, the UV light source beneficially has a power such that a rapid polymerization is prevented (say between 1 to 5 $mW/cm^2$).

The present invention can be applied to a liquid crystal displays that use a TFT (thin film transistor), a MIM (Metal-insulator-Metal), a poly-Si or a diode.

While the invention has been particularly shown and described with reference to an embodiment thereof, it will be understood by those skilled in the art that the foregoing and other changes in form and details may be made therein without departing from the spirit and scope of the invention. Thus, it is intended that the present invention covers the modifications and variations of this invention provided they come within the scope of the appended claims and their equivalents.

What is claimed is:

1. A liquid crystal display device, comprising:
   a first orientation film on a first substrate;
   a second substrate spaced apart from said first substrate by a gap;
   a second orientation film on the second substrate; and
   a ferroelectric liquid crystal layer having a mono-domain in the gap,
   wherein the ferroelectric liquid crystal layer includes a polymer network formed along and across molecular layer boundaries of the ferroelectric liquid crystal layer, wherein the molecular layer boundaries are parallel to the first and second substrates, and wherein the polymer network is uniformly formed in an entire region of the ferroelectric liquid crystal layer.

2. A liquid crystal device according to claim 1, wherein the polymer network is a polymerized additive.

3. A liquid crystal device according to claim 2, wherein the additive includes an acrylate compound.

4. A liquid crystal device according to claim 2, wherein the additive is between 1 and 3% by weight of the ferroelectric liquid crystal layer.

5. A liquid crystal device according to claim 1, further comprising a backlight.

6. A liquid crystal device according to claim 1, further comprising a thin film transistor.

7. A liquid crystal device according to claim 1, wherein the first substrate is transparent.

8. A liquid crystal device according to claim 7, further comprising a pixel electrode on the first substrate.

9. A liquid crystal device according to claim 1, further comprising a color filter on the second substrate.

* * * * *